United States Patent [19]
Sakasegawa et al.

[11] Patent Number: 6,149,482
[45] Date of Patent: Nov. 21, 2000

[54] METHOD FOR MANUFACTURING FLAT PLATE WITH PRECISE BULKHEAD, FLAT PLATE WITH PRECISE BULKHEAD, METHOD FOR MANUFACTURING PLASMA DISPLAY UNIT SUBSTRATE AND PLASMA DISPLAY UNIT SUBSTRATE

[75] Inventors: Kiyohiro Sakasegawa; Makoto Yoshida; Masashi Katoh; Kenichi Yoneyama; Yasuhiko Nishioka, all of Kagoshima, Japan

[73] Assignee: Kyocera Corporatin, Kyoto, Japan

[21] Appl. No.: 09/070,210

[22] Filed: Apr. 30, 1998

[30] Foreign Application Priority Data

| Apr. 30, 1997 | [JP] | Japan | 9-111692 |
| Apr. 30, 1997 | [JP] | Japan | 9-111693 |
| Apr. 30, 1997 | [JP] | Japan | 9-111694 |
| Apr. 30, 1997 | [JP] | Japan | 9-111695 |
| Apr. 30, 1997 | [JP] | Japan | 9-111696 |

[51] Int. Cl.⁷ ............................................. H01J 9/00
[52] U.S. Cl. ........................................ 445/24; 313/582
[58] Field of Search .................... 445/24, 25; 313/582, 313/583, 584

[56] References Cited

U.S. PATENT DOCUMENTS 5,742,122  4/1998  Amemiya et al. .................... 313/584

FOREIGN PATENT DOCUMENTS 48905  5/1989  Japan ........................................ 445/24

*Primary Examiner*—Kenneth J. Ramsey
*Attorney, Agent, or Firm*—Hogan & Hartson LLP

[57] ABSTRACT

A method for manufacturing plasma display unit substrates having bulkheads by applying a mixture of ceramic powder or glass powder and a binder to a back face plate made of ceramics or glass. Bulkheads are formed on the back face plate by rolling a roll, having a plurality of grooves on its surface, over the mixture-applied surface of the back face plate while applying pressure to the surface with the roll. Alternatively, the grooves on the surface of the roll may be pre-filled with the moisture and rolled over the surface of a back face plate, thereby forming bulkheads.

17 Claims, 12 Drawing Sheets

METHOD FOR MANUFACTURING FLAT PLATE WITH PRECISE BULKHEAD, FLAT PLATE WITH PRECISE BULKHEAD, METHOD FOR MANUFACTURING PLASMA DISPLAY UNIT SUBSTRATE AND PLASMA DISPLAY UNIT SUBSTRATE

BACKGROUND OF THE INVENTION

1. Field of the Invention

The present invention relates to a method for manufacturing flat plate with a precise bulkhead, flat plate with a precise bulkhead, method for manufacturing plasma display unit substrate used for highly accurate and inexpensive large-screen color display units, etc., and plasma display unit substrate.

2. Description of the Prior Art

The plasma display unit used for thin type large screen color display units, etc. has a construction in which opposite electrodes are installed in the space surrounded with bulkheads called microscopic display cells, and the space is sealed with dischargeable gas such as noble gas, etc., and plasma is generated by discharges between opposite electrodes, and the phosphor is allowed to emit light by the plasma to use it as a light emitting element of the screen.

Typically, as shown in FIG. 12, a substrate 105 comprises a large number of bulkheads 102 formed on the whole surface of the back face plate 101. Each space 103 between bulkheads 102 is designated as a cell. Electrodes 104 are placed on the bottom surface of each cell 103. With respect to this substrate 105, phosphor is applied to the inner wall surface 106 of the cell 103, whereas the front panel 108 with the electrodes 107 is joined with the bulkheads 102 of the substrate 105, and gas is sealed in the cell 103 to form a plasma display unit. The electrodes 104, 107 are, in actuality, arranged in such a manner to intersect each other at right angles, but in FIG. 12, they are arranged in parallel for description.

Now, in manufacturing the substrate 105 for the plasma display unit, first a large number of electrodes 104 are formed on the back face plate 101 then the bulkhead 106 is formed between each electrodes 104. Manufacturing methods of bulkheads 106, such as the print lamination method, additive method, sandblast method, and photosensitive paste method are well known.

The print lamination method is to print to form a bulkhead 102 of a specified pattern on the back face plate 101 by the thick film printing method using pastes of the material comprising the bulkhead 102, and since the thickness formed by one printing is about 30 μm, the bulkhead 102 which requires about 200 μm height is formed by repeating printing and drying (see Japanese Non-examined Patent Publication No. Hei 2-213020).

The additive method is to apply photosensitive resin on the back face plate 101, to curve grooves by the light on the photosensitive resin, and to embed pulverized glass in the groove to form the bulkhead 102.

In addition, the sand blast method is to form a glass layer of a specified thickness on the whole surface of the back face plate 101, on this surface, to form the resist mask in the form of the bulkhead 102 and then, to remove the glass layer of the portion other than the bulkhead 102 by sandblasting (see Japanese Non-examined Patent Publication No. Hei 4-259728).

In addition to this, the photosensitive paste method is to apply the paste with photosensitive resin mixed on the back face plate 101, and after masking, to irradiate light to directly form the bulkhead 102.

SUMMARY OF THE INVENTION

However, in the print lamination method, the printing and drying processes must be repeated many times to laminate film layers in order to form the bulkhead 102 of a specified height, resulting in extremely many number of processes, and in addition, since it is necessary to accurately print for each lamination layer, the yield was extremely poor. Furthermore, the bulkhead 102 is likely to deform due to misregistration at the time of printing, and due to elongation of printing prepress and others, for the dimensional accuracy of the display cell formed by the bulkhead 102, the maximum difference of the measured value is about 0.35 mm when the size of 1000 cells is measured for 45 rows, which did not satisfy at all the requirements of increased accuracy and fineness.

In addition, the additive method is also a method to form the bulkhead 102 using the light. This methods does not always allow forming the bulkhead 102 with satisfactory accuracy.

In the sand blast method, too, since sand blasting is carried out after using photoresist for forming the mask, the process is complicated, and it is difficult to form the bulkhead 102 with high accuracy. When abrasives are recovered to be repeatedly used for blasting, grinding force is lowered or changed with time due to wear and degradation of the abrasives, and it is difficult to consistently mass-produce the bulkhead 102. On the other hand, when the abrasives are not recovered for reuse, the cost of the abrasives becomes high, and mass-production is also difficult in this case.

In addition to this, the photosensitive paste method forms the bulkhead 102 using the light, and does not always produce the bulkhead 102 with satisfactory accuracy.

In the plasma display unit substrate 105, it is strongly requested to arrange the bulkhead 102 precisely and with good accuracy between electrodes 104 on the back face plate 101, but it has been difficult to manufacture large-size plasma display unit substrate 105 with high-accuracy microscopic pitches through a simple process at low cost using any of the above-mentioned manufacturing methods.

Under these circumstances, it is the main object of this invention to provide a plasma display unit substrate and the manufacturing method thereof that can manufacture plasma display unit substrates at one simple forming process at a high yield, and at the same time, that can secure highly precise bulkhead with a smooth surface free of deformation at a specified height, that can easily achieve an increased screen exceeding 40 inches, and that can achieve improved refinement of display cell pitch less than 0.25 mm.

Phosphor is applied to the inner wall surface 106 of the bulkhead 102, but even when phosphor is applied to the inner wall surface 106, phosphor drips from the inner wall surface 106 and phosphor is unable to be satisfactorily applied to the inner wall surface 106.

In addition, the edges of the top surface bulkhead 102 tend to generate chipping when they come in contact with the front face plate 108. No methods for preventing such damage are currently available.

In the plasma display unit substrate 105, phosphor is applied to the inner wall surface 106 of the bulkhead 102, but there is a fear in that phosphor drips on the cell 103 between bulkheads 102, and phosphor flows out from the cell 103.

Furthermore, the plasma display unit substrate 105 has a thin back face plate 101 and causes warpage when fired after the bulkhead 102 is formed on the back face plate 101.

The plasma display unit substrate bulkhead has the mixture comprising ceramic, or glass powders, and binders formed into a back face plate comprising ceramics or glass. For this binder, acrylic resin with good thermal decomposition is, in general, used from the view point of degreasing capability. The sintering temperature of this acrylic resin is as low as 500 to 600° C., and it provides good thermal decomposition and excellent degreasing capability, but green strength of bulkhead lacks.

When bulkheads are formed on the back face plate by rolling over it a roll a plurality of circumferential grooves, resin components which make a resin soft and pliable are required. However, the bulkheads are subject to thermal deformation when composed with such resin components.

Under these circumstances, in order to form precise bulkheads, this invention intends to be a method for manufacturing flat plates with highly precise bulkheads in which a mixture of ceramics powder or glass powder and the binder is applied to the plate material comprising ceramics or glass and bulkheads are formed on the plate material by rotating the mixture-applied surface with the mixture-applied surface pressurized with the roll surface carved with a plurality of grooves.

This invention intends to manufacture highly precise bulkheads by a method for manufacturing flat plates with highly precise bulkheads.

In addition, this invention intends to be a method for manufacturing plasma display unit substrates by applying a mixture of ceramics powder or glass powder and the binder to the back face plate comprising ceramics or glass, and forming bulkheads on the back face plate by rotating the mixture-applied surface with the mixture-applied surface pressurized with the surface of the roll carved with a plurality of grooves in order to manufacture a large-size plasma display unit substrate with highly precise microscopic pitches.

Furthermore, this invention intends to manufacture the plasma display unit substrate by the method for manufacturing the plasma display unit substrate.

The invention intends to be a method for manufacturing a plasma display unit substrate in which, first, a mixture of ceramics powder or glass powder and the binder are applied to the back face plate made of ceramics or glass. Then, an electrode paste is applied on top of the mixture. Bulkheads and electrodes between bulkheads are formed on the back face plate by rolling a roll with a plurality of grooves on the mixture-applied back face plate surface while applying a pressure to the surface with the roll.

In addition to this, the invention intends to be a method for manufacturing plasma display unit substrate in which a mixture of ceramics powder or glass powder and the binder is applied to the back face plate comprising ceramics or glass, on the applied mixture, the black-based material is further applied, bulkheads are formed on the back face plate by rotating the roll on the mixture-applied surface while pressurizing with the roll surface with a plurality of grooves, and the black-based material is arranged at the tip end of the bulkhead in order to accurately arrange the black-based material at the top of the bulkhead.

Still furthermore to this, the invention intends to be a method for manufacturing plasma display unit substrate in which a mixture of ceramics powder or glass powder and the binder is applied to the back face plate comprising ceramics or glass, on the applied mixture, the mold releasing agent is further applied, bulkheads are formed on the back face plate by rotating the roll on the mixture-applied surface while pressurizing with the roll surface with a plurality of grooves, and the mold releasing agent is arranged at the tip end of the bulkhead in order to accurately release the bulkhead from the roll after processing.

Still in addition to this, the invention intends to be a method for manufacturing plasma display unit substrate in which polyvinylbutyral resin is applied to the back face plate comprising ceramics or glass, on the polyvinylbutyral resin, a mixture of ceramics powder or glass powder and the binder is applied, bulkheads are formed on the back face plate by rotating the roll on the mixture-applied surface while pressurizing with the roll surface with a plurality of grooves, and the smoothness of the back face plate and the adhesion between the back face plate and the bulkhead are improved by the polyvinylbutyral resin applied in order to improve the smoothness of the substrate and adhesion between the back face plate and the bulkhead.

The invention intends to be a method for manufacturing a flat plate with precise bulkhead in which a plurality of grooves carved in the roll are filled with a mixture of ceramics powder or glass powder and the binder, and the roll is brought in contact with the plate material comprising ceramics and glass and is rotated to form bulkheads on the plate material in order to form precise bulkheads.

The invention intends to manufacture the precise bulkhead by the method for manufacturing flat plates equipped with the precise bulkheads.

The present invention intends to be a method for manufacturing plasma display unit substrates in which a plurality of grooves carved in the roll are filled with a mixture of ceramics powder or glass powder and the binder, and the roll is brought in contact with the plate material comprising ceramics and glass and is rotated to form bulkheads on the back face plate in order to enable manufacture of large-size plasma display unit substrate equipped with highly accurate and microscopic pitches.

Still in addition to this, the invention intends to manufacture the plasma display unit substrates by the above mentioned method for manufacturing plasma display unit substrates.

In addition, the invention intends to be a method for manufacturing plasma display unit substrates in which a mixture of ceramics powder or glass powder and the binder is applied to the back face plate comprising ceramics or glass, the grooves carved on the roll are filled with the mixture of ceramics powder or glass powder and the binder, and the roll is brought in contact with the back face plate with the mixture applied and is rotated to form bulkheads on the back face plate in order to enable manufacture of large-size plasma display unit substrate equipped with highly accurate and microscopic pitches.

In addition, the invention intends to be a method for manufacturing plasma display unit substrates in which a plurality of grooves carved on the roll are filled first with the black-based material powders, then with the mixture of ceramics powder or glass powder and the binder, and the roll is brought in contact with the back face plate with the mixture applied and is rotated to form bulkheads on the back face plate with the bulkhead top surface formed with the black-based material in order to positively arrange the black-based material at the top of the bulkhead of the substrate. In addition to this, the invention intends to be a method for manufacturing plasma display unit substrates in which polyvinylbutyral resin is applied to the back face plate comprising ceramics or glass, on the polyvinylbutyral resin, a mixture of ceramics powder or glass powder and the binder is applied, bulkheads are formed on the back face plate by rotating the roll on the mixture-applied surface while pressurizing with the roll surface with a plurality of grooves, and the smoothness of the back face plate and the adhesion between the back face plate and the bulkhead are improved by the polyvinylbutyral resin applied in order to improve the smoothness of the substrate.

The invention intends to be a plasma display unit substrate in which bulkheads are formed with a mixture of ceramics powder or glass powder and the binder, and on the inner wall surface of the bulkhead, longitudinal phosphor holding grooves are carved in order to successfully hold phosphor on the inner wall surface of the bulkhead.

The invention intends to be a plasma display unit substrate in which the bulkhead is formed with a mixture of ceramics powder or glass powder, and the binder on the back face plate comprising ceramics or glass and both edge portions of the bulkhead are formed in the form of circular arc in order to prevent damage to the tip ends of both edges of the bulkhead.

Therefore, the invention intends to be a plasma display unit substrate comprising a plurality of bulkheads formed with a mixture of ceramics or glass powders and the binder on the back face plate comprising ceramics or glass in order to prevent phosphor applied to the inner wall surface of the bulkhead from flowing out from the cell, wherein weirs for preventing flow-out of phosphor applied to the inner wall surface of the bulkheads are provided on both edges of the cell between bulkheads.

The invention intends to be a plasma display unit substrate comprising a large number of bulkheads formed with a mixture of ceramics or glass powders and the binder on the back face plate comprising ceramics or glass in order to prevent warpage of the substrate because the substrate is too thin to be warped, wherein frames higher than the cell bottom surface between bulkheads and lower than the bulkhead tip end are formed around the plurality of bulkheads.

The invention intends to be a plasma display unit substrate comprising bulkheads composed with ceramics powder or glass powder, and binder formed on the back face plate comprising ceramics or glass in order to achieve good thermal decomposition and satisfactory green strength of the bulkhead at the time of firing, wherein polyvinylbutyral resin is used for the binder.

The invention intends to be a plasma display unit substrate comprising bulkheads composed with ceramics powder or glass powder, and binder formed on the back face plate comprising ceramics or glass in order to achieve good thermal decomposition, satisfactory green strength of the bulkhead, and less thermal deformation of the bulkhead, wherein polyvinylbutyral resin and UV curable resin are used for the binder.

DETAILED DESCRIPTION OF THE PREFERRED EMBODIMENTS

Figure 1:
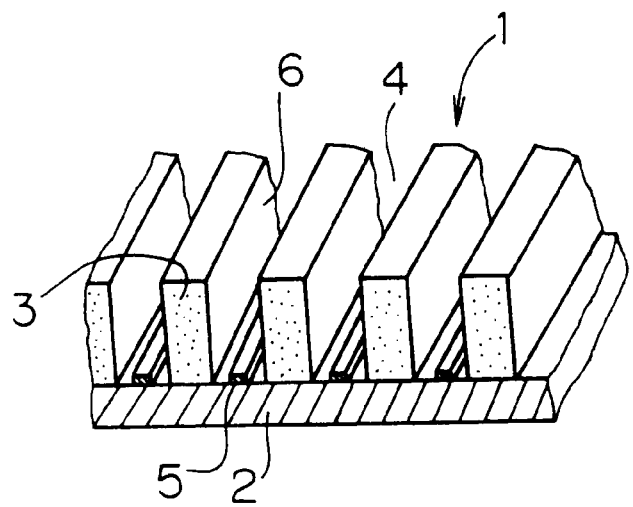
FIG. 1 is a perspective view showing a plasma display unit substrate related to the invention.

Referring now to the drawings, preferred embodiments according to the invention will be described in detail hereinafter.

As shown in FIG. 1, the substrate 1 for plasma display units is equipped with a plurality of bulkheads 3 comprising ceramics or glass. The bulkheads 3 are located on one surface of back face plate 2 made of ceramics or glass. Cells 4 are formed between bulkheads 3.

Figure 12:
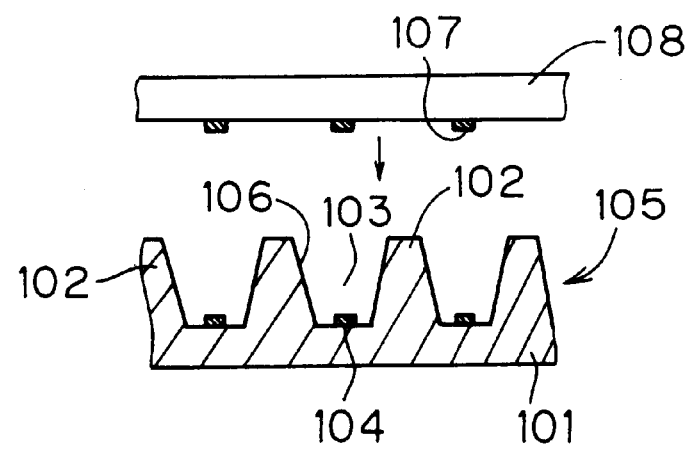
FIG. 12 is a longitudinal sectional view showing the outline of the conventional plasma display unit.

On the bottom surface of this cell 4, an electrode 5 is placed, and after phosphor is applied to the inner wall surface 6 of the cell 4, the upper end of the bulkhead 3 is covered with a front plate 108 equipped with an electrodes 107 as shown in FIG. 12, and gas is sealed in the cell 4, thereby enabling composing a plasma display unit. And discharging electricity between electrodes 5, 107 allows the phosphor applied to the inner wall surface 6 of the cell 4 to emit light. In actuality, electrodes 5, 107 are arranged to cross at right angles each other. Though not illustrated, it is possible to adopt a 3electrode system in which the electrode 107 is formed with a pair of electrodes In this case, the system will be of a plane discharge type in which maintenance discharge is generated between a pair of electrodes 107 and is controlled by the electrode 5 of back face plate 2.

Next discussion will be made on the manufacturing method of the substrate 1.

Figure 2:
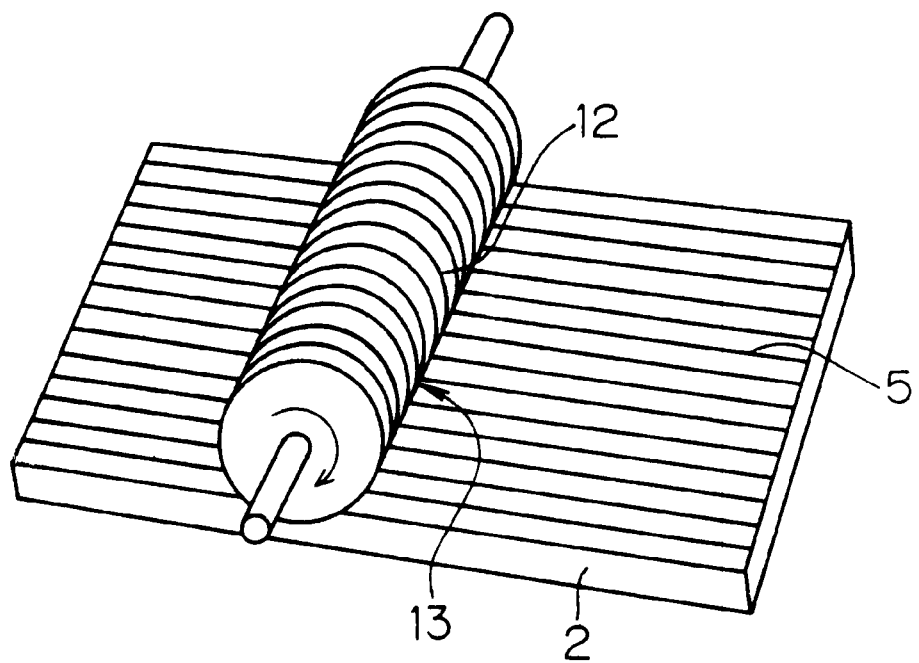
FIG. 2 is a perspective view showing the outline of the manufacturing method of the invention.

FIG. 2 schematically shows the general view.

Figure 3:
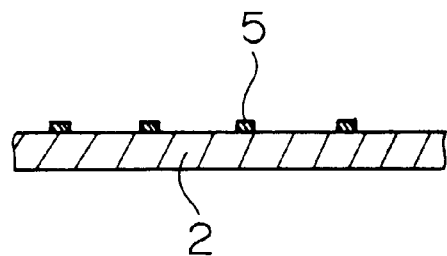
FIG. 3 is a longitudinal sectional view showing the condition in which electrodes are affixed to the whole surface of the back face plate by printing related to the invention.

On one surface of the back face plate 2 comprising ceramics or glass shown in FIG. 3, electrodes 5 are formed at specified intervals by screen printing.

Figure 4:
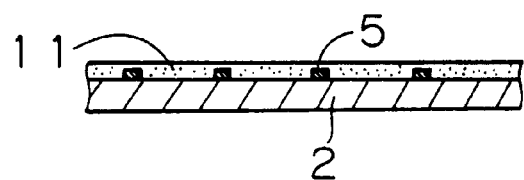
FIG. 4 is a longitudinal sectional view showing the condition with the mixture paste adhering to the back face plate.

As shown in FIG. 4, a paste 11 of a mixture of ceramics or glass powders is applied to the back face plate 2 with the electrodes 5 in place.

Figure 5:
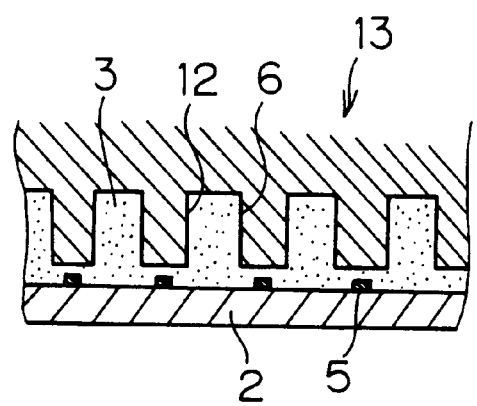
FIG. 5 is a longitudinal sectional view showing the condition of bulkheads formed on the back face plate with a roll.

Then, as shown in FIG. 5, the surface of a roll 13 having circumferential grooves 12 of a specified width and a specified depth at specified intervals corresponding to bulkheads 3 is brought into contact with the surface applied with the paste 11 after drying, and the roll is pressurized and rotated to form bulkheads 3 on the back face plate 2. That is, by bringing the roll 13 in contact and pressurizing the roll, the paste 11 enters the circumferential grooves 12 of the roll 13 and solidifies, and bulkheads 3 are formed.

The pressurizing force of the roll 13 is, for example, about 7 kg per 1 cm of contact length with the paste 11 in the axial direction of the roll 13, and 700 kg at contact length of 100 cm.

Thereafter hardening bulkheads 3 by heat treatment can produce the substrate 1. As described above, because according to this invention, all we need is to bring the roll 13 in contact and pressurize and rotate the roll, if the roll 13 is fabricated at a high accuracy in advance, precision bulkheads 3 can be easily formed, and even a large-size substrate 1 can be easily manufactured.

The manufacturing method of the invention described above can be applied not only to substrates for plasma display units but also precision bulkheads in various members such as ink jet printer heads or optical communication members.

Now, for ceramics powders of the paste 11 forming bulkheads 3, any of oxide based ceramics such as alumina ($Al_2O_3$), zirconia ($ZrO_2$), etc., nonoxide based ceramics, etc. such as silicon nitride ($Si_3N_4$), aluminum nitride (AlN), silicon carbide (SiC), etc., or apatite ($Ca_5(PO_2)_3$ (F, Cl, OH)) can be used, and to these ceramics powders, various sintering assistants may be added in a desired quantity.

For the above sintering assistants, a desired quantity of silica ($SiO_2$), calcia (CaC), yttoria ($Y_2O_3$), magnesia (MgO), etc. can be added to alumina powders, oxides of rare earth elements such as yttoria ($Y_2O_3$) or cerium (Ce), dysprosium (Dy), ytterbium (Yb), etc. to zirconia powders, yttoria ($Y_2O_3$), alumina ($Al_2O_3$), etc. to silicon nitride powders, oxides of periodic table group 3b elements ($RE_2O_3$), etc. to aluminum nitride powders, boron (B), carbon (C), etc. to silicon carbide powders.

For glass powders forming bulkheads 3, various glasses with silicate as a main component and containing one or more kinds of lead (Pb), sulphur (S), selenium (Se), aluminum(Al), etc. may be used.

In addition, forming bulkheads 3 with glass and adding ceramics as a filler can improve the strength and optical characteristics. For example, from the purposes to improve light reflectivity and brightness of the panel, alumina, zirconia, titania, zinc oxide, and other white ceramics are added as required, and for the purposes of improving the light shieldability and panel contrast, nickel oxide, copper oxide, chromium oxide, and other deep color ceramics are added as required in accord with purposes.

For the grain size of these ceramics or glass powders, scores of microns to submicrons can be suitably used, and specifically 0.2 to 10 $\mu$m, and more preferably 0.2 to 5 $\mu$m.

In addition, examples of organic additives to be added to these ceramics or glass powders include polyvinyl alcohol, polyvinylbutyral, acrylic resin, styrene resin, urethane resin, etc.

The solvent to be added to the mixture paste 11 is not particularly limited if it is compatible with the organic additives, and examples include toluene, xylene, benzene, ester phthalein, etc. for aromatic solvents, hexanol, octanol, decanol, oxyalcohol, etc. for higher alcohol, or acetate, glyceride, etc. for esters.

In particular, ester phthalein, oxyalcohol, etc. can be suitably used, and in addition, in order to gradually evaporate the solvent, two or more solvents can be combined to use.

For the content of the solvent, 0.1 parts by weight or more are required for 100 parts by weight of ceramics or glass powders in order to maintain shape holding capability of the formed product from the viewpoint of moldability, while from the viewpoint of lowering the viscosity of the mixture of ceramics or glass powders and organic additives, 35 parts by weight or lower is more preferable, and 1 to 15 parts by weight is most preferable in view of shrinkage at the time of drying and firing.

The material of roll 13 in the invention is not particularly limited, but for example, metal, resin, or rubber can be used, and if required, in order to improve the mold releasing capability or to prevent wear, surface treatment such as surface coating, etc. can be carried out. The grooves formed on the roll 13 are not limited to circumferential grooves but may be parallel to the axial direction of the roll 13.

The back face plate 2 is an unsintered green sheet or sintered compact, and the material is not particularly limited, but may be, for example, various ceramic green sheets, various glass substrates, porcelain substrates, etc. and is preferable to have a coefficient of thermal expansion similar to that of the material of bulkhead 3. For glass substrates, for example, soda lime glass or in order to improve the warping point, glass with inorganic filler dispersed or other comparatively inexpensive glass can be used.

In the mixture paste 11, in order to improve dispersibility of ceramics or glass powders, for example, polyethylene glycol ether, alkyl sulfonate, polyearbonate, alkyl ammonium salt, and other surfactants may be added, and are preferably contained 0.05–5 parts by weight to 100 parts by weight of ceramics or glass powder from the viewpoint of improved dispersibility and thermal decomposition.

In addition, for the binder in the mixture paste 11, the hardening catalyst called hardening reaction accelerator or polymerization initiator, etc. can be added. For the hardening catalyst, organic peroxides or azo-compounds may be used, whose example include ketone peroxide, diacyl peroxide, peroxiketal, peroxiester, hydroperoxide, peroxycarbonate, t-butylperoxi-2-ethylhexanoate, bis (4-t-butyl cyclohexyl) peroxydicarbonate, dicumyl peroxide, and other organic peroxides, and azobisisoburyronitrile, and other azo-compounds.

Now, other embodiment will be described.

Figure 6:
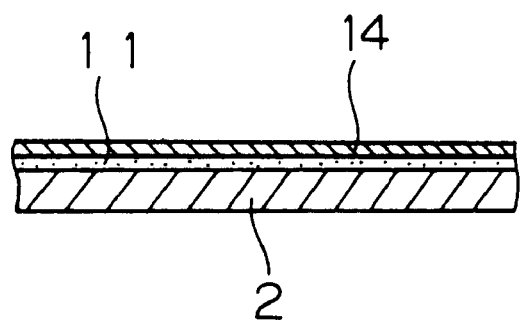
FIG. 6 is a longitudinal sectional view of the back face plate when the electrode paste is applied.

In FIG. 6, on the back face plate 2, paste 11 of a mixture of ceramics or glass powders and the binder is applied, and on the applied mixture paste 11, electrode paste 14 is applied.

Figure 7:
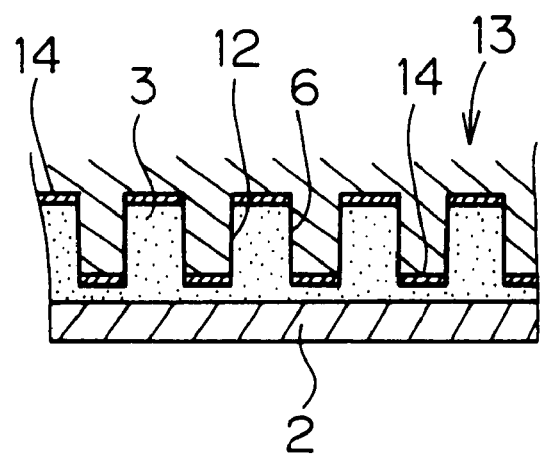
FIG. 7 is a longitudinal sectional view showing the condition of the surface shown in FIG. 6 where bulkheads are formed on the back face plate with a roll.

As with the method described above, the roll 13 having a plurality of circumferential grooves 12 is brought in contact with the back face plate, and pressurized and rotated; then, as shown in FIG. 7, bulkheads 3 are formed, and electrode pastes 14 are accurately arranged between the bulkheads 3 forming electrodes 5. If no electrode paste 14 at the tip end of the bulkhead 3 is required, it may be scraped away.

Figure 8:
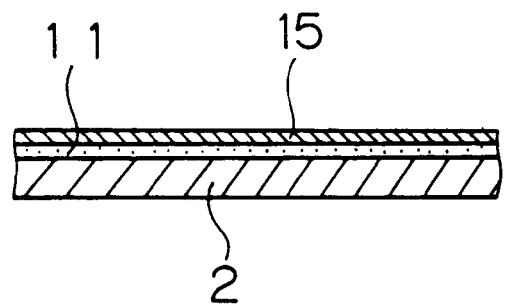
FIG. 8 is a longitudinal view of the condition with black-based material applied to the back face plate.

In the method described above, an example in which electrodes 5 are accurately arranged between the bulkhead 3 and the bulkhead 3 is described, but when black-based material is installed at the tip end of the bulkhead 3 in order to improve adhesion between the back face plate 2 and the front plate 108 and provide contrast to the image, a black-based material 15 is further applied on the mixture paste 11 as shown in FIG. 8.

Figure 9:
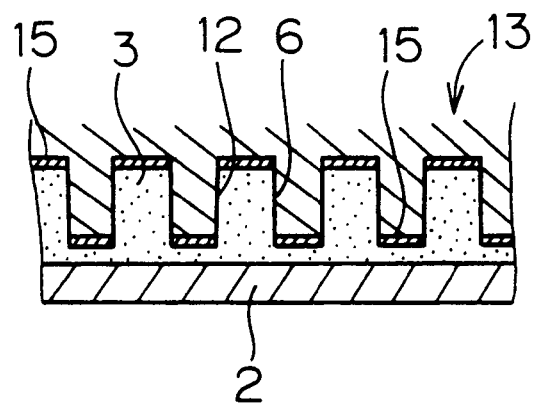
FIG. 9 is a longitudinal sectional view showing the condition of the surface shown in FIG. 8 where bulkheads are formed on the back face plate with a roll.

In the same manner as described above, a roll 13 with a plurality of circumferential grooves 12 is rotated with the roll held in contact with the black-based material 15 as shown in FIG. 9 to form bulkheads 3 on the back face plate 2, and the black-based material 15 can be accurately installed at the tip end of the bulkhead 3. For the black-based material, for example, black glass is used.

Figure 10:
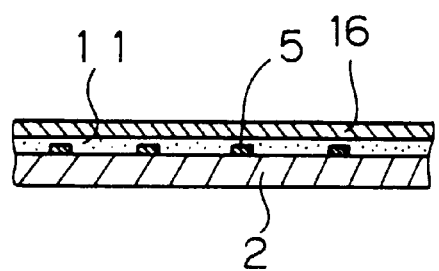
FIG. 10 is a longitudinal sectional view showing the condition where the mold releasing agent is affixed to the back face plate.

In addition, in order to positively release bulkheads 3 from molds after forming with the roll 13, as shown in FIG. 10, a mold releasing agent 16 may be applied on the mixture paste 11 affixed to the top surface of the back face plate 2.

Figure 11:
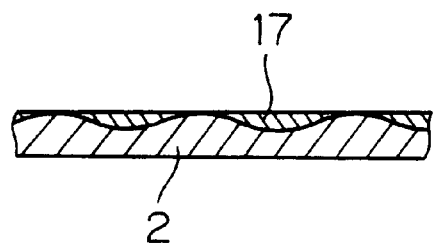
FIG. 11 is a longitudinal sectional view showing the condition where the irregular surface of the back face plate is applied with polyvinylbutyral resin to produce a smooth surface.

On the surface of the back face plate 2 comprising ceramics or glass, about ±10 $\mu$m irregularities exist, but as shown in FIG. 11, polybutyral resin 17 is applied to smoothen the surface of the back face plate 2, and on the surface, bulkheads 3 may be formed. Even if there exist slight irregularities on the surface of the back face plate 2, it is possible to rotate the roll 13 smoothly by applying polybutyral resin 17, and the back face plate 2 can be formed accurately on the bulkhead 3.

Thereafter, even polybutyral resin 17 exists when heated, the bulkhead 3 moves until it comes in contact with the back face plate 2. The back face plate 2 comprising in this way can be affixed to the front plate 108 without any problem.

EMBODIMENT

EMBODIMENT 1

For the roll 13, on a metal roll 50 mm in diameter by 200 mm long, 900 circumferential grooves 50 $\mu$m wide by 200 $\mu$m deep were carved at a 220 $\mu$m pitch. On the other hand, for the back face plate 2, 200×250 mm soda lime glass sheet was prepared.

For the paste 11, low-melting point lead glass powders with alumina and titania added were mixed and kneaded with a binder to make a paste, and was applied to the glass sheet by a doctor blade technique. The roll was pressurized at a pressure of 7 kg/cm from above the film, and as the roll was rotated, the glass sheet was fed at the same time, and bulkheads were formed.

The formed product obtained was fired at 550–600° C.

With the above-mentioned operation, a plasma display unit substrate equipped with bulkheads 40 $\mu$m wide by 150 $\mu$m high was obtained.

EMBODIMENT 2

As with the case of Embodiment 1, a roll with circumferential grooves and glass sheet with the paste applied were prepared. On the paste applied surface, a conductive paste primarily comprising Ag was applied for the electrode paste 14 and dried at 80° C. The roll was pressurized at 7 kg/cm and rotated, and bulkheads were formed on the glass sheet.

The formed product obtained was fired at 550–600° C.

With the above operation, a plasma display unit substrate equipped with bulkheads 40 $\mu$m wide by 150 $\mu$m high was obtained. In this event, spaces between bulkheads are filled with the conductive paste and functioned as electrodes.

EMBODIMENT 3

As with the case of Embodiment 1, a roll with circumferential grooves was prepared. For the paste, a white paste with titania added and a black paste with nickel oxide was added as black-based material 15 were prepared.

The white paste was applied on the glass sheet material and dried, and then, the black paste was applied on the white paste applied surface.

At 7 kg/cm pressure, bulkheads were formed by the roll.

The formed product obtained was fired at 550–600° C., and a plasma display unit substrate whose tip end of the bulkhead was black was obtained.

EMBODIMENT 4

Polybutyral resin made solvent by the volatile solvent was applied to the glass sheet surface and dried.

When bulkheads were formed by the same technique as in the case of Embodiment 1, variations of bulkhead height caused by variation in thickness of glass sheet were ±3 $\mu$m in this embodiment, which used to be ±10 $\mu$m.

Figure 13:
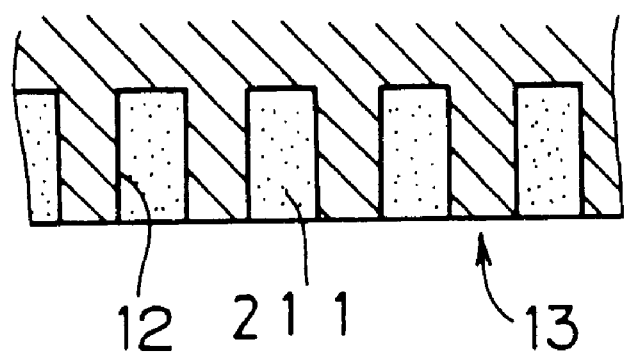
FIG. 13 is a longitudinal sectional view showing the condition with the back face plate applied with the mixture paste.

As shown in FIG. 13, the paste 211 of a mixture of ceramics or glass powders were filled into circumferential grooves 12 of the roll 13 equipped with circumferential grooves 12 of a specified width and depth at specified intervals in correspondence with the bulkhead 3.

Figure 14:
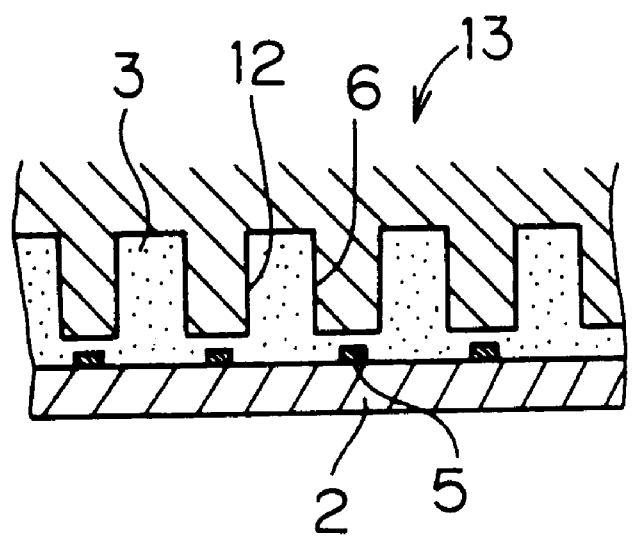
FIG. 14 is a longitudinal sectional view showing the condition with bulkheads formed on the rear face plate by a roll.

Then, as shown in FIG. 14, the roll 13 was brought in contact with the back face plate 2, pressurized and rotated to form bulkheads 3 on the back face plate 2. That is, rotating the roll 13 while in contact with the back face plate 2 causes the paste 211 filled in the circumferential grooves 12 to elect with the profile of circumferential groove 12 maintained, and thereby bulkheads 3 are formed.

The pressurizing force of the roll 13 is about 7 kg per 1 cm of contact length with the paste 211 in the axial direction of the roll 13, and 700 kg per 100 cm contact length.

Thereafter, hardening bulkheads 3 by heat treatment produces a substrate 1.

As described above, according to the invention, only pressurizing and rotating the roll 13 while bringing it in contact with the back face plate is required, and if the roll 13 is fabricated in advance at a high accuracy, bulkheads 3 of high accuracy can be easily formed, and even a large-size substrate 1 can be easily manufactured.

While the roll 13 is rotated on the back face plate 2 and at the same time filling the circumferential grooves 12 on the roll 13 with the paste 211 can continuously form even long bulkheads 3. In addition, it is possible to construct in such a manner that the paste 211 is injected from the inside of the roll 13 in such event and it is fed to the circumferential grooves 12.

The manufacturing method of the invention described above can be applied to precision bulkheads in various members such as ink jet printer heads or optical communication members in addition to the substrates for plasma display units as with the case described above.

For the ceramic powders of the mixture paste 211 for forming bulkheads 3, sintering assistants, and glass powders for forming bulkheads, those used in the previous cases are used.

The point to form bulkheads 3 and add ceramics as a filler, grain size of ceramics or glass powders, organic additives to be added to ceramics or glass powders, solvents added to the paste 211 of the mixture, suitable solvents, content of the solvent, material of roll 13, back face plate 2, improvement of dispersibility of ceramics or glass powders in the mixture paste 211, and the binder in the paste 211 of the mixture are all same as with the cases mentioned above.

Now, still other embodiment will be described.

Figure 15:
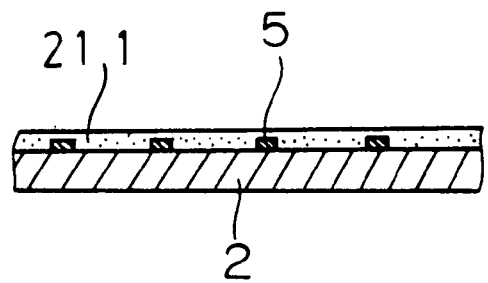
FIG. 15 is a longitudinal sectional view showing the condition with the mixture paste applied in advance to the back face plate according to the invention.

In FIG. 15, the paste 211 of the mixture of ceramics or glass powders and binders are applied to the back face plate 2 in advance. In this Way, on the paste 211 of mixture applied, the roll 13 with its circumferential grooves 12 filled with the mixture paste 211 are rotated to form bulkheads 3 on the back face plate 2. Doing this way allows the paste of the mixture filled in the roll 13 to satisfactorily adhere to the paste 211 of the mixture on the back face plate 2.

Figure 16:
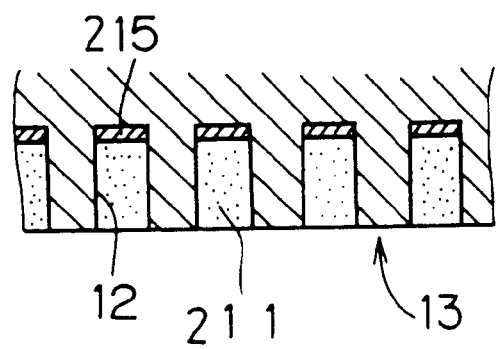
FIG. 16 is a longitudinal sectional view showing the condition where the circumferential grooves of the roll according to the invention are filled first with black-based material powders, then with a mixture paste.

When a black-based material is provided at the tip end of bulkheads 3 in order to improve the adhesion between the back face plate 2 and the front plate 108 and to provide contrast to the image as shown in FIG. 16, the circumferential grooves 12 of the roll 13 shall be first filled with the black-based material 215, and then the mixture paste 211 is filled.

Figure 17:
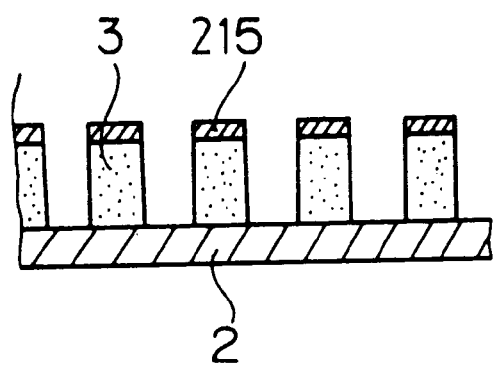
FIG. 17 is a longitudinal sectional view showing the condition where black-based material is formed at the tip end of the bulkhead of the back face plate according to the invention.

Rotating the roll 13 on the back face plate 2 can form bulkheads 3 with the black-based material 215 provided at the tip end as shown in FIG. 17. For the black-based material, for example, black glass if used.

EMBODIMENT 5

For the roll 13, a metal roll 50 mm in diameter by 200 mm long was used, and 900 pieces of circumferential grooves 50 μm wide by 200 μm deep were carved at a 220 μm pitch. For the paste 211, alumina and titania were added to the zinc-based low-melting point glass and blended with a binder to prepare the white paste.

To the back face plate 2 comprising 200×250 mm soda lime glass sheet, polybutyral resin which was made into a solution with volatile solvent comprising toluene and ethanol was applied, and the solvent components were dried.

The roll was filled with the white paste and dried. The roll was brought in contact with the glass sheet, and glass sheet was fed with the roll rotated, and the paste inside the roll circumferential grooves were transferred on to the glass sheet.

The formed product obtained was fired at 550–600° C. to make a substrate for plasma display units.

EMBODIMENT 6

For the black-based material 15, alumina and nickel oxide were added to lead-base low-melting point glass, were mixed to produce a black paste. The roll grooves insides were filled with black paste, and wiping away an excess paste, the black paste was left only at the bottom of the roll circumferential grooves. Thereafter, in the same procedure as in the case of Embodiment 5, plasma display units were prepared. The tip end portion of the obtained bulkheads was formed with black glass.

Figure 18:
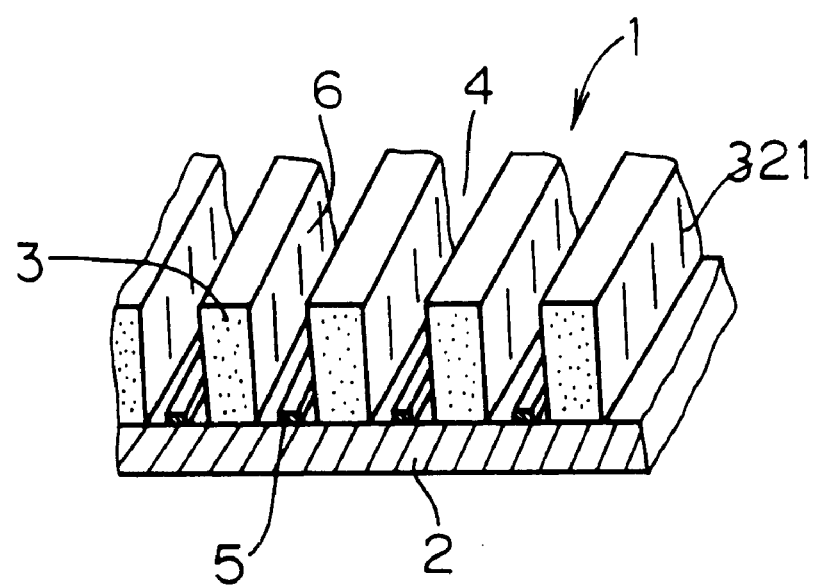
FIG. 18 is a perspective view showing the condition where phosphor holding grooves are carved on the inner wall surface of the bulkhead of the invention.

In the substrate 1 for plasma display units of the invention, when phosphor is applied to the inner wall surface 6 of the bulkhead 3, phosphor holding grooves 321 are carved on the inner wall surface 6 in the direction substantially perpendicular as shown in FIG. 18 so that phosphor can be satisfactorily held without dripping. Carving holding grooves in a different direction in not preferable in view of the strength of bulkheads 3. The depth of the holding grooves 321 is preferably about Rmax 3–10 μm in the surface roughness when the inner wall surface 6 is measured with a surface roughness gauge. This is because since the grain size of phosphor is 3 μm, the size of the holding groove 321 is 3 μm at minimum, whereas if it is greater than 10 μm, it will have detrimental effects on the strength of bulkheads 3. If holding grooves 321 are formed on bulkheads 3 when bulkheads 3 are released from the circumferential grooves 12 of the roll 13 in the longitudinal direction when bulkheads 3 are formed by the roll 13, no special process if required and holding grooves 321 can be formed at low cost.

Figure 19:
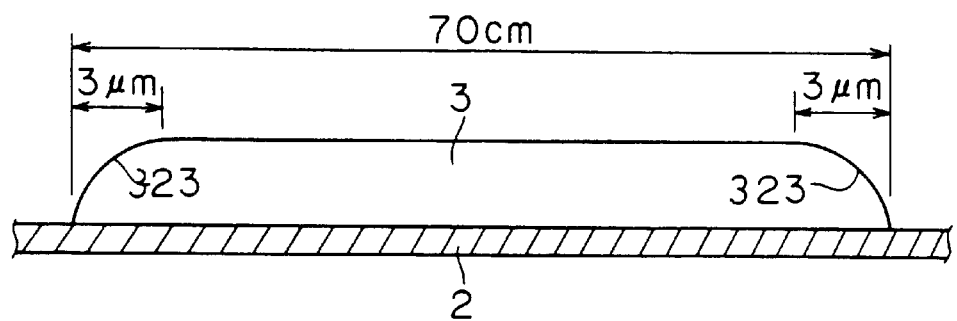
FIG. 19 is a side view showing the condition where a circular arc is formed at the tip end portion on both edges of the bulkhead of the invention.

In order to prevent breakage of the tip ends on both edges of bulkheads 3, as shown in FIG. 19, the tip end portion on both edges are formed in a form of a circular arc 323. When tip end portions on both edges of bulkheads 3 are formed in a form of circular arc 323, no chipping is generated even when the front plate 108 comes in contact. The total length of bulkheads 3 is, for example, about 70 cm, and on both edges of the bulkhead, circular arcs 323 are formed in the range smaller than 3 μm in the lengthwise direction. When bulkheads 3 are formed with the roll 13, bulkheads 3 with sufficient height are unable to be formed at the beginning and at the end of forming, and result in a circular arc form 323. That is, by bulkheads 3 are formed with the roll 13 no special process is required for forming a circular arc 323 at the tip end portions on both edges of bulkheads 3, and the circular arcs 323 can be formed at low cost.

Figure 20:
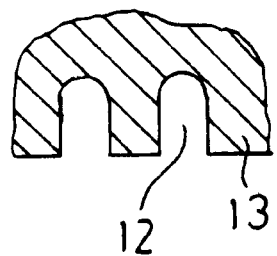
FIG. 20 is a sectional view of the roll according to the invention.
Figure 21:
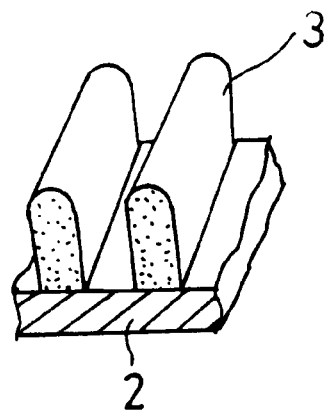
FIG. 21 is a perspective view of bulkheads formed by the roll of FIG. 20.

In addition, the cross-sectional form of circumferential grooves 12 of the roll 13 may be made into a profile that fits to the required bulkheads 3. For example, as shown in FIG. 20, if the bottom surface of the circumferential groove 12 of the roll 13 is made into a recessed curved form, the tip end of bulkheads 3 can be made into a protruded curved form as shown in FIG. 21.

EMBODIMENT 7

For the roll 13, on a metal roll 50 mm in diameter by 200 mm long, 900 circumferential grooves 50 μm wide by 200 μm deep were carved at a 220 μm pitch. On the other hand, for the back face plate 2, 200×250 mm soda lime glass sheet was prepared.

For the paste, low-melting point lead glass powders with alumina and titania added were mixed and kneaded with a binder to make a paste, and was applied to the glass sheet by a doctor blade technique. The roll was pressurized at a pressure of 7 kg/cm from above the film, and as the roll was rotated, the glass sheet was fed at the same time, and bulkheads were formed.

The formed product obtained was fired at 550–600° C.

With the above-mentioned operation, a plasma display unit substrate equipped with bulkheads 40 μm wide by 150 μm high was obtained.

On the inner wall surface of this bulkhead, Rmax 3–10 μm longitudinal grooves were formed when the bulkhead was separated from the roll, which could be used for phosphor holding grooves 321.

In addition, by forming with a roll, both edges of the bulkhead were short for a specified height, and circular arc forms 323 were able to be formed in the range of less than 3 μm in the lengthwise direction.

Figure 22:
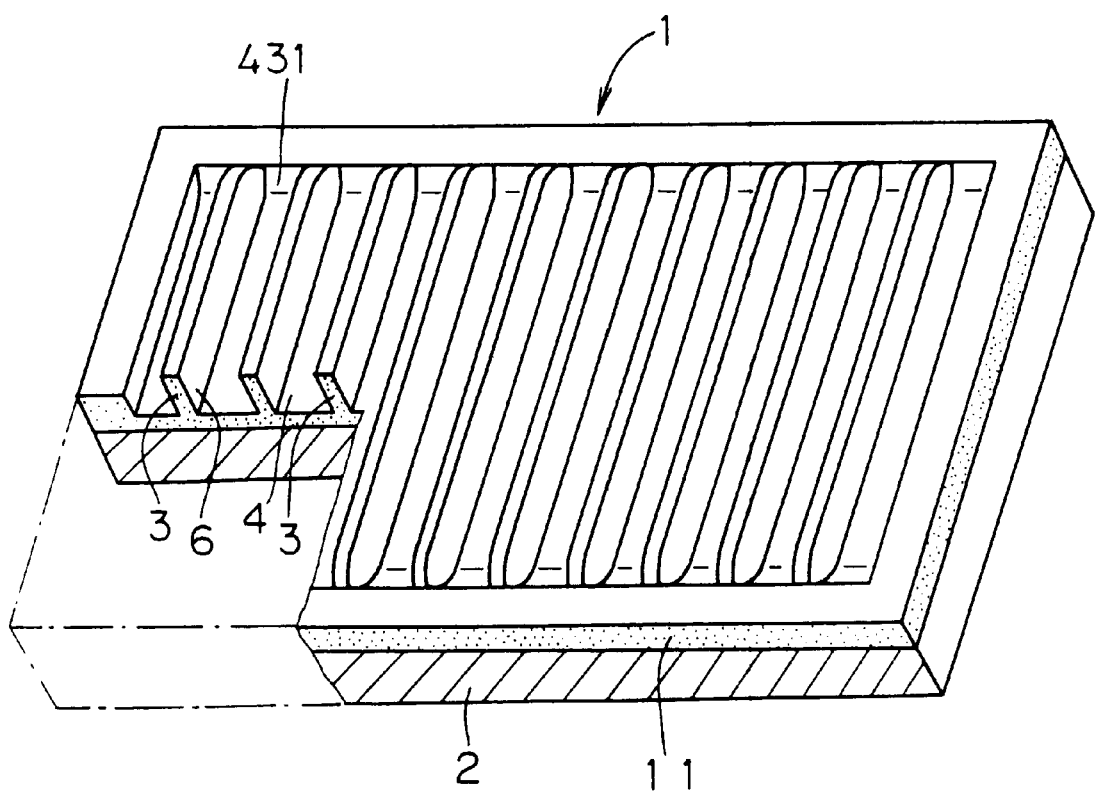
FIG. 22 is a perspective view of the substrate according to the invention, to which weirs for preventing phosphor from flowing out are equipped.

As the substrate 1 for plasma display units of the invention is shown in FIG. 22, a large number of bulkheads 3 are formed on the back face plate 2. To the inner wall surface of bulkheads 3, phosphor is applied, dripping phosphor collects in the cell 4 between the bulkhead 3 and the bulkhead 3, and there is a fear of the collecting phosphor to flow out of the substrate 1. Therefore, in this invention, weirs for preventing flow-out of phosphor 431 and substantially perpendicular to the surface of the plate, are provided on both edges between bulkheads 3.

That is, when bulkheads 3 are formed by rolling the mixture paste 11 applied to the back face surface 2 with a roll 13, leaving the un-rolled portions of the mixture paste 11 at the head end and the tail end can form phosphor flow-out prevention weirs 431 as illustrated. The existence of this flow-out prevention weir 431 can prevent phosphor from flowing out from the cell 4 or flowing into the adjoining cells 4. In this way, the flow-out prevention weir 431 can be formed simultaneously when bulkheads 3 are formed by the roll 13, requires no special process and can offer at inexpensive cost.

Figure 23:
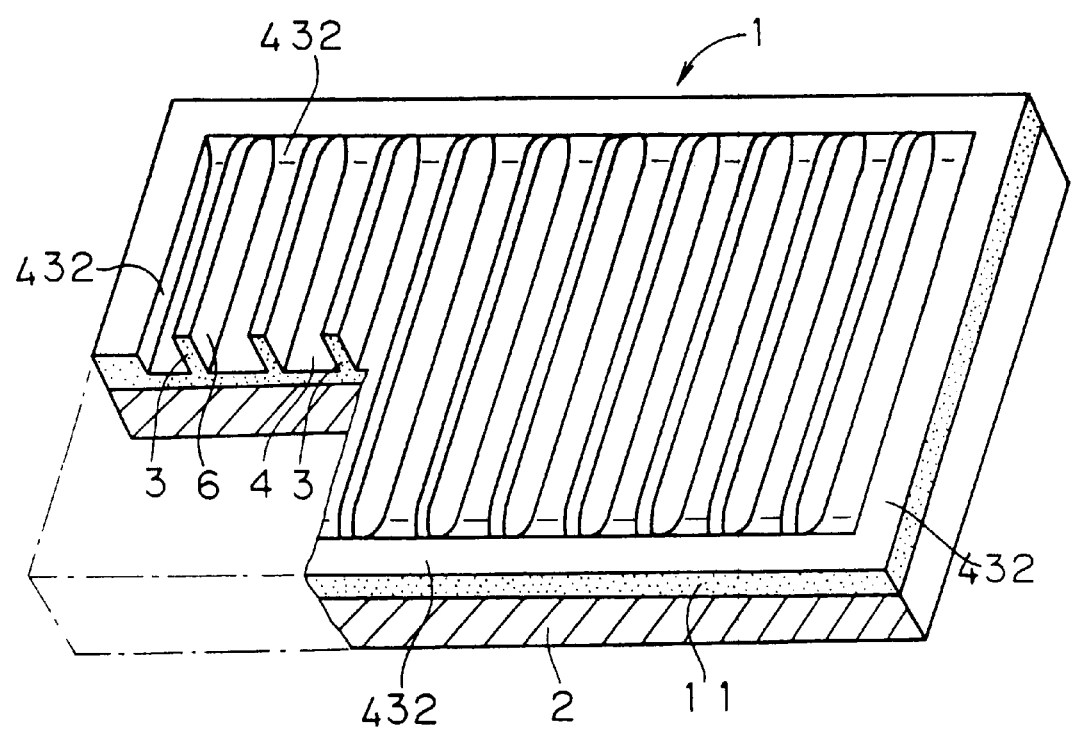
FIG. 23 is a perspective view of the substrate to which a frame according to the invention is installed.

Because the back face plate 2 is thin, there is a fear of causing warpage at the time of firing. In this invention, as shown in FIG. 23, a frame 432 is formed around the plurality of bulkheads 3 formed. This frame 432 can be formed simultaneously when bulkheads 3 are formed by the roll 13, and as described before, at the head end and the tail end, un-rolled portions of mixture paste 11 are left, and at the same time, un-rolled portions are also left on both side portions, and a frame 432 is formed in such a manner that the frame surrounds the plurality of bulkheads 3 formed. The frame is formed to be higher than the bottom surface of the cell 4 and lower than the tip end surface of bulkheads 3. In this way, the frame 432 is able to be formed simultaneously when bulkheads 3 are formed by the roll 13, and does not need any special process, and can be offered at low price.

To this frame, an exhaust system and other apparatus may be easily installed as required.

EMBODIMENT 8

For the roll 13, on a metal roll 50 mm in diameter by 200 mm long, 900 circumferential grooves 50 gm wide by 200 μm deep were carved at a 200 μm pitch. On the other hand, for the back face plate 2, 200×250 mm soda lime glass sheet was prepared.

For the paste 11, low-melting point lead glass powders with alumina and titania added were mixed and kneaded with a binder to make a paste, and was applied 80 gm thick to the glass sheet by a doctor blade technique. The roll was pressurized at a pressure of 7 kg/cm from above the film, and as the roll was rotated, the glass sheet was fed at the same time, and bulkheads were formed The formed product obtained was fired at 550–600° C.

With the above-mentioned operation, a plasma display unit substrate equipped with bulkheads 40 μm wide by 150 μm high was obtained. In this event, the flow-out prevention weirs 431 and the frame 432 were able to be formed as shown in FIGS. 22 and 23.

On the other hand, bulkheads 3 are able to be formed by filling the circumferential grooves 12 with the mixture paste 11 and bringing them into the back face plate 2 and pressurizing.

As shown in FIG. 13, the circumferential grooves 12 of the roll 13 which has circumferential grooves 12 in specified width and depth at specified intervals in correspondence to bulkheads 3 are filled with the paste 211 of a mixture of glass powders and binder.

Now as shown in FIG. 14, the roll 13 is brought in contact with the back face plate 2 and rotated while pressurizing to form bulkheads 3.

The pressurizing force of the roll 13 is about 7 kg per 1 cm of contact length with the axial direction paste 211 of the roll 13, and 700 kg at 100 cm of contact length.

This invention is characterized by the use of polybutyral resin for a binder in order to improve the degreasing capability and to improve green strength of bulkheads 3 by thermal decomposition at the time of sintering bulkheads 3.

Decomposition of butyral resin is finished at 250–400° C., and the bulkheads 3 are provided with the strength that can stand the pressure of 60 kg/cm$^2$ or higher as a panel .When bulkheads 3 are formed with the roll 13, resin that is easy to form is used, but bulkheads 3 formed with the resin easy to be formed are subject to thermal deformation. To prevent this, UV curable resin is added, and irradiating with ultraviolet rays cures bulkheads 3 and thermal deformation is not generated.

EMBODIMENT 9

For the roll 13, on a metal roll 50 mm in diameter by 200 mm long, 900 circumferential grooves 50 μm wide by 200 μm deep were carved at a 220 μm pitch. On the other hand, for the back face plate 2, 200×250 mm soda lime glass sheet was prepared.

For the paste 211, low-melting point lead glass powders with alumina and titania added were mixed and kneaded with a binder to make a paste, and was applied to the glass sheet by a doctor blade technique. The roll was pressurized at a pressure of 7 kg/cm from above the film, and as the roll was rotated, the glass sheet was fed at the same time, and bulkheads were formed.

The formed product obtained was fired at 550–600° C. In this event, the product was heated from 250 to 400° C. at a rate of 2° C./min.

With the above-mentioned operation, a plasma display unit substrate equipped with bulkheads 40 μm wide by 150 μm high was obtained.

EMBODIMENT 10

Bulkheads were formed with all the conditions same as those of Embodiment 9, with exception that to the paste 211, UV curable epoxy resin was added.

After the bulkheads were cured by irradiating with ultraviolet rays, the product was fired in the same manner as with the above case.

Because the bulkheads are difficult to be deformed even when butyral resin is softened, the heating rate from 250 to 400° C. was able to be increased to 10° C./min.

With the above-mentioned operation, a plasma display unit substrate equipped with bulkheads 40 µm wide by 150 µm high was obtained.

EFFECT OF THE INVENTION

Because this invention intends to be a method for manufacturing flat plates with highly precise bulkheads in which a mixture of ceramics powder or glass powder and the binder is applied to the plate material comprising ceramics or glass and bulkheads are formed on the plate material by rotating the mixture applied surface with the mixture-applied surface pressurized with the roll surface carved with a plurality of grooves, it is possible to provide a method for manufacturing precision bulkheads at inexpensive cost and reliably.

This invention intends to manufacture highly precise bulkheads by a method for manufacturing flat plates with highly precise bulkheads.

In addition, because this invention intends to be a method for manufacturing plasma display unit substrates by applying a mixture of ceramics powder or glass powder and the binder to the back face plate comprising ceramics or glass, and forming bulkheads on the back face plate by rotating the mixture-applied surface with the mixture-applied surface pressurized with the surface of the roll carved with a plurality of grooves, it is possible to manufacture a large-size plasma display unit substrate with highly precise microscopic pitches by a simple process at a low cost.

Furthermore, because this invention intends to manufacture the plasma display unit substrate by the method for manufacturing the plasma display unit substrate, it is possible to provide a precise and low-cost plasma display unit substrate.

Because the invention intends to be a method for manufacturing a plasma display unit substrate in which a mixture of ceramics powder or glass powder and the binder is applied to the back face plate comprising ceramics or glass, on the applied mixture, the electrode paste is further applied, bulkheads are formed on the back face plate by rotating the roll on the mixture-applied surface while pressurizing with the roll surface with a plurality of grooves, and electrodes are arranged between bulkheads, the electrodes can be positively arranged between bulkheads on the substrate.

In addition to this, because the invention intends to be a method for manufacturing plasma display unit substrate in which a mixture of ceramics powder or glass powder and the binder is applied to the back face plate comprising ceramics or glass, on the applied mixture, the black-based material is further applied, bulkheads are formed on the back face plate by rotating the roll on the mixture-applied surface while pressurizing with the roll surface with a plurality of grooves, and the black-based material is arranged at the tip end of the bulkhead, the black glass can be positively arranged at the tip end of the bulkhead an the substrate.

Still furthermore to this, because the invention intends to be a method for manufacturing plasma display unit substrate in which a mixture of ceramics powder or glass powder and the binder is applied to the back face plate comprising ceramics or glass, on the applied mixture, the mold releasing agent is further applied, bulkheads are formed on the back face plate by rotating the roll on the mixture-applied surface while pressurizing with the roll surface with a plurality of grooves, and the mold releasing agent is arranged at the tip end of the bulkhead, the bulkhead can be accurately released from the roll after processing.

Sill in addition to this, because the invention intends to be a method for manufacturing plasma display unit substrate in which polyvinylbutyral resin is applied to the back face plate comprising ceramics or glass, on the polyvinylbutyral resin, a mixture of ceramics powder or glass powder and the binder is applied, bulkheads are formed on the back face plate by rotating the roll on the mixture-applied surface while pressurizing with the roll surface with a plurality of grooves, and the smoothness of the back face plate and the adhesion between the back face plate and the bulkhead are improved by the polyvinylbutyral resin applied, the roll can be smoothly rotated by applying polybutyral resin even if there are irregularities on the surface of the back face plate, and bulkhead can be formed accurately on the back face plate.

Because the invention intends to be a method for manufacturing a flat plate with precise bulkhead in which a plurality of grooves carved in the roll are filled with a mixture of ceramics powder or glass powder and the binder, and the roll is brought in contact with the plate material comprising ceramics and glass and is rotated to form bulkheads on the plate material in order to form precise bulkheads, a method for manufacturing precision bulkheads can be offered at low cost and reliably.

Because the invention intends to manufacture the precise bulkhead by the method for manufacturing flat plates equipped with the precise bulkheads, it is possible to offer precision bulkheads.

Because the present invention intends to be a method for manufacturing plasma display unit substrates in which a plurality of grooves carved in the roll are filled with a mixture of ceramics powder or glass powder and the binder, and the roll is brought in contact with the plate material comprising ceramics and glass and is rotated to form bulkheads on the back face plate, it is possible to manufacture large-size plasma display unit substrate equipped with highly accurate and microscopic pitches in a simple process at low cost.

Because the invention intends to manufacture the precise bulkhead by the method for manufacturing flat plates equipped with the precise bulkheads, it is possible to offer precision and low-cost plasma display unit substrates.

In addition to this, because the invention intends to be a method for manufacturing plasma display unit substrates in which a mixture of ceramics powder or glass powder and the binder is applied to the back face plate comprising ceramics or glass, the grooves carved on the roll are filled with the mixture of ceramics powder or glass powder and the binder, and the roll is brought in contact with the back face plate with the mixture applied and is rotated to form bulkheads on the back face plate, it is possible to manufacture large-size plasma display unit substrate equipped with highly accurate and microscopic pitches.

In addition, because the invention intends to be a method for manufacturing plasma display unit substrates in which a plurality of grooves carved on the roll are filled first with the black-based material powders, then with the mixture of ceramics powder or glass powder and the binder, and the roll is brought in contact with the back face plate with the mixture applied and is rotated to form bulkheads on the back face plate with the bulkhead tip end formed with the black-based material, it is possible to positively arrange the black-based material at the tip end of the bulkhead of the substrate.

Further in addition to this, because the invention intends to be a method for manufacturing plasma display unit substrates in which polyvinylbutyral resin is applied to the back face plate comprising ceramics or glass, on the polyvinylbutyral resin, a mixture of ceramics powder or glass powder and the binder is applied, bulkheads are formed on the back face plate by rotating the roll on the mixture-applied surface while pressurizing with the roll surface with a plurality of grooves, and the smoothness of the back face plate and the adhesion between the back face plate and the bulkhead are improved by the polyvinylbutyral resin applied, it is possible to smoothly rotate the roll by applying polybutyral resin even if slight irregularities are present on the surface of the back face plate, and to accurately form bulkheads on the back face plate.

Because the invention intends to be a plasma display unit substrate in which bulkheads are formed with a mixture of ceramics powder or glass powder and the binder, and on the inner wall surface of the bulkhead, longitudinal phosphor holding grooves are carved, it is possible to successfully hold phosphor on the inner wall surface of the .bullhead and sufficiently apply to the inner wall surface.

Because the invention intends to be a plasma display unit substrate in which the bulkhead is formed with a mixture of ceramics powder or glass powder, and the binder on the back face plate comprising ceramics or glass and both edge portions of the bulkhead are formed in the form of circular arc, it is possible to easily prevent breakage to the tip ends of both edges of the bulkhead.

Because the invention intends to be a plasma display unit substrate comprising a plurality of bulkheads formed with a mixture of ceramics or glass powders and the binder on the back face plate comprising ceramics or glass, wherein weirs for preventing flow-but of phosphor applied to the inner wall surface of the bulkheads are provided on both edges of the cell between bulkheads, it is possible to provide weirs for preventing phosphor applied to the inner wall surface of the bulkhead from flowing out from the cell at low cost and decisively.

Because the invention intends to be a plasma display unit substrate comprising a large number of bulkheads formed with a mixture of ceramics or glass powders and the binder on the back face plate comprising ceramics or glass, wherein frames higher than the cell bottom surface between bulkheads and lower than the bulkhead tip end are formed around the plurality of bulkheads, it is possible to provide a frame that can reinforce the substrate at low cost and positively.

Because the invention intends to be a plasma display unit substrate comprising bulkheads composed with ceramics powder or glass powder, and binder formed on the back face plate comprising ceramics or glass in order to achieve good, thermal decomposition and satisfactory green strength of the bulkhead at the time of firing, wherein polyvinylbutyral resin is used for the binder, it is possible to improve the degreasing capability by thermal decomposition at the time of sintering of bulkheads and to improve the green strength of bulkheads.

Because the invention intends to be a plasma display unit substrate comprising bulkheads composed with ceramics powder or glass powder, and binder formed on the back face plate comprising ceramics or glass, wherein polyvinylbutyral resin and UV curable resin are used for the binder, forming is easy and the bulkheads can be hardened by irradiating with ultraviolet rays, and are become difficult to be thermally deformed.

What is claimed is:

1. A method for manufacturing a flat plate with highly precise bulkheads, comprising:

providing a flat plate made of ceramics or glass;

applying a mixture of ceramic powder or glass powder and a binder to a surface of the flat plate; and forming bulkheads on the flat plate by rolling a roll having a plurality of grooves on its surface over the mixture-applied surface of the flat plate while applying a pressure to the surface with the roll.

2. A method for manufacturing a plasma display unit substrate, comprising:

providing a plasma display unit substrate, comprising a back face plate made of ceramics or glass;

applying a mixture of ceramic powder or glass powder and a binder to a surface of the back face plate; and forming bulkheads on the back face plate by rolling a roll having a plurality of grooves on its surface, over the mixture-applied surface of the back face plate while applying a pressure to the surface with the roll.

3. A method for manufacturing a plasma display unit substrate according to claim 2, comprising the further step of:

applying an electrode paste over the mixture before the step of forming bulkheads, whereby the electrodes are formed between bulkheads on the substrate after rolling the roll.

4. A method for manufacturing a plasma display unit substrate according to claim 2, comprising the further step of:

applying a black-based material over the applied mixture before the step of forming bulkheads, whereby a top surface of the bulkheads is coated with the black-based material after rolling the roll.

5. A method for manufacturing a plasma display unit substrate according to claim 2, comprising the further step of:

applying a mold-releasing agent over the applied mixture before the step of forming bulkheads to assist the release of the formed bulkheads from the roll.

6. A method for manufacturing a plasma display unit substrate according to claim 2, comprising the further step of:

applying a polyvinylbutyral resin to the back face plate to form a smooth surface of the back face plate before the step of applying the mixture.

7. A method for manufacturing a flat plate with precise bulkheads, comprising:

providing a flat plate made of ceramics or glass;

filling a plurality of grooves formed on a surface of a roll with a mixture of ceramic powder or glass powder and the binder; and rolling the roll over the flat plate to form bulkheads on the plate.

8. A method for manufacturing a plasma display unit substrate, comprising:

providing a plasma display unit substrate, comprising a back face plate made of ceramics or glass;

filling a plurality of grooves formed on a surface of a roll with a mixture of ceramic powder or glass powder and the binder; and rolling the roll over the back face plate to form bulkheads on the plate.

9. A method for manufacturing a plasma display unit substrate, comprising:

providing a plasma display unit substrate, comprising a back face plate made of ceramics or glass;

applying a first mixture of ceramic powder or glass powder and a binder to the back face plate;

filling a plurality of grooves formed on a surface of a roll with a second mixture of ceramic powder or glass powder and a binder; and rolling the roll over the back face plate with the first mixture applied to form bulkheads on the plate.

10. A method for manufacturing a plasma display unit substrate according to claim 8, comprising the further step of:

filling the grooves on the surface of the roll with a black-based material powder prior to the step of filling the grooves with the mixture.

11. A method for manufacturing a plasma display unit substrate according to claim 8, comprising the further step of:

applying a polyvinylbutyral resin to the back face plate to form a smooth surface before the step of applying the mixture.

12. A plasma display unit substrate, comprising a back face plate made of ceramics or glass and bulkheads formed of ceramics or glass, wherein grooves in a direction substantially perpendicular to the surface of the plate are provided on side surfaces of the bulkheads.

13. A plasma display unit substrate, comprising a back face plate, a plurality of bulkheads formed of ceramics or glass on the plate, and weirs for preventing flow-out or phosphor applied to side walls of the bulkheads, wherein the weirs extend perpendicularly to the surface of the plate.

14. A plasma display unit substrate, comprising a back face plate, a plurality of bulkheads formed of ceramics or glass on the plate, and a frame formed on the plate enclosing the bulkheads, the frame having a height less than or equal to a height of the bulkheads.

15. A plasma display unit substrate, comprising a back face plate and a plurality of bulkheads formed of ceramics or glass on the plate, wherein each bulkhead has opposed longitudinal sides laterally spaced from a central longitudinal plane, the longitudinal sides intersect proximal and distal sides forming proximal and distal edges, and the proximal and distal edges have an arc shape in the central longitudinal plane.

16. A pre-fired intermediate for a plasma display unit substrate, comprising bulkheads formed with a back face plate made with ceramics or glass, wherein the bulkheads comprise ceramic powder or glass powder and a polyvinylbutyral resin.

17. The pre-fired intermediate of claim 16, wherein the bulkheads further comprise a UV curable resin.

* * * * *